(No Model.)
G. LAUBE.
VEHICLE WHEEL.
No. 538,734. Patented May 7, 1895.
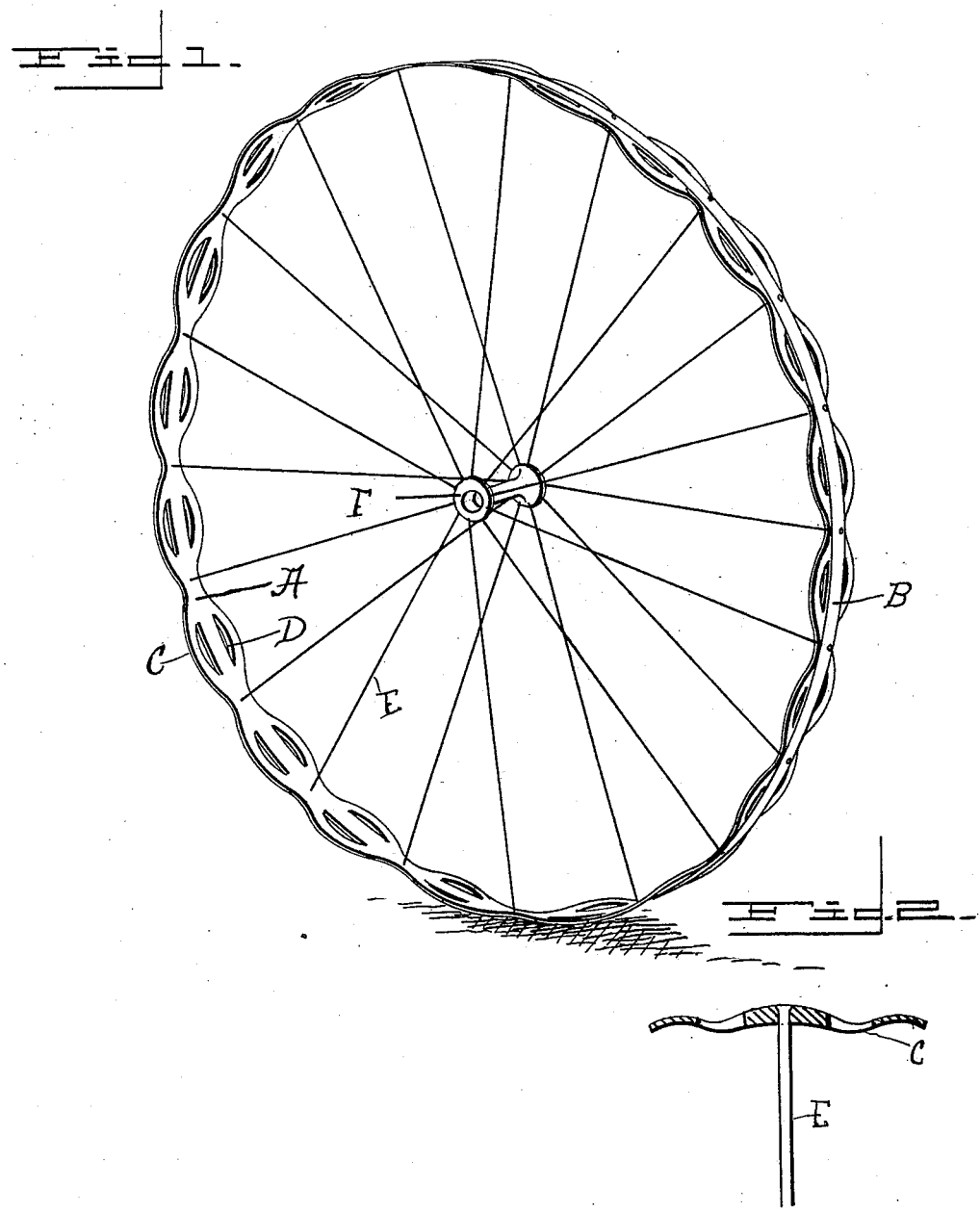
Witnesses
J. C. Gaither, Jr.
C. L. Reese
Inventor
Godfried Laube
G. Evert Appleman.
Attorneys.

UNITED STATES PATENT OFFICE.

GODFRIED LAUBE, OF HURON, SOUTH DAKOTA, ASSIGNOR OF ONE-HALF TO JOSEPH HYMANS, OF DEL RIO, TEXAS.

VEHICLE-WHEEL.

SPECIFICATION forming part of Letters Patent No. 538,734, dated May 7, 1895.

Application filed March 24, 1894. Serial No. 504,915. (No model.)

*To all whom it may concern:*

Be it known that I, GODFRIED LAUBE, a citizen of the United States of America, residing at Huron, in the county of Beadle and State of South Dakota, have invented certain new and useful Improvements in Vehicle-Wheels, of which the following is a specification, reference being had to the accompanying drawings.

This invention relates to certain new and useful improvements in vehicle wheels, and is particularly designed and applicable to all classes of light vehicles.

The invention has for its object the construction of a novel attachment for vehicle wheels, that will answer the combined purposes of tire, felly and safety guard; furthermore, a device that will add both strength and durability to the wheel.

The invention further contemplates to employ novel means whereby the wheel will be prevented from slipping into narrow ruts and depressions in the road, thus not allowing the vehicle to receive the sudden jar or shock that would otherwise take place.

A still further object of the invention is to construct an attachment that will be comparatively inexpensive to manufacture and possess a general appearance that will be highly attractive.

With the above and other objects in view the invention consists in the peculiar construction and arrangement of parts to be hereinafter more particularly described and specifically pointed out in the claim.

In describing the invention in detail reference is had to the accompanying drawings forming a part of this specification wherein like letters of reference indicate similar parts throughout both views, in which—

Figure 1 is a view in perspective, showing my invention applied to the wheel. Fig. 2 is a similar view of a modified form of felly.

In the drawings, A represents the continuous band or tire having a central head or bearing B, said band being provided with outwardly extending wings C placed at equi-distance on the periphery of the wheel.

D, represents the perforations formed in the wings.

E, illustrates the spokes which may be of the ordinary construction, and F the hub of the wheel.

The spokes are secured to the device in any suitable manner, and are placed in such position that a set of wings will appear between the spokes, thus dividing the weight of the vehicle when the same passes over a rut and the wings brought into service.

The attachment is rolled out of a single piece of metal, and it will be obvious that the rolls may be so formed as to produce the above described device in one operation. Any suitable metal may be used for this purpose.

The wings contain perforations for the purpose of constructing the device as light as possible, thereby adding but little additional weight to the wheel; yet it will be understood that the wings may be made solid if desired.

Referring to the modification shown in Fig. 2, of the drawings, the wings are slightly curved in order to add strength to the latter when acting as a bearing, another advantage being that this design presents a very neat appearance.

The herein described device should be considered as an improvement upon similar applications made by me, bearing even date herewith.

Particular attention is called to the fact that I do not wish to limit myself to this specific construction as various changes may be made without departing from the scope of the invention.

Having fully described my invention, what I claim as new, and desire to secure by Letters Patent, is—

In a combined tire and felly, consisting of a continuous band having a central head or bearing and laterally extending perforated wings, at the sides of said central bearing, said wings being slightly curved outwardly, substantially as described.

In testimony whereof I affix my signature in presence of two witnesses.

GODFRIED LAUBE.

Witnesses:
ANNIE T. LAUBE,
HATTIE ROSE LAUBE.